United States Patent Office 3,154,521
Patented Oct. 27, 1964

3,154,521
POLYURETHANES FROM POLYESTERS OF POLY-CARBOXYLIC ACID, TERTIARY-AMINO-DIOL AND TERTIARY-AMINO-POLYOL
Joseph A. Terek, Wheaton, Md., and William D. Stewart, North Springfield, Va., assignors to Atlantic Research Corporation, Fairfax, Va., a corporation of Virginia
No Drawing. Filed Feb. 2, 1960, Ser. No. 6,112
19 Claims. (Cl. 260—75)

This invention relates to new elastomeric polyurethane polymers, and, more specifically, to polyurethane rubbers having improved low-temperature properties.

Rubber employed for such purposes as fuel hose lines, gaskets, and the like, in arctic and other frigid areas, must retain its elastomeric properties and good tensile strength at the low temperatures encountered. Considerable research has been done, with some success, to develop synthetic rubbers which will meet low temperature specifications. Unfortunately, some of the products are excessively costly for general use and others are effective over too limited a low temperature range.

The object of this invention is to provide polyurethane rubbers which retain their strength and flexibility at exceedingly low temperatures.

Another object is to provide such rubbers which can be produced at low to moderate cost.

Broadly speaking, the invention comprises esterifying a polycarboxylic acid, first with a tertiary-amino-diol in an amount which leaves some of the carboxyl groups unreacted, and then with a minor proportion of a tertiary-amino-polyol, containing more than 2 functional hydroxy groups, in an amount sufficient to react with the remaining carboxyl groups and to produce a polyester polyol product, and then reacting the polyester polyol with a polyisocyanate.

The polycarboxylic acid is preferably an aliphatic dibasic acid such as fumaric acid, maleic acid, malic acid, adipic acid, suberic acid, azelaic acid, sebacic acid and isomers of such acids, such as isosebacic acid. We have found the isomeric acids carrying short lower-alkyl side chains particularly suitable for our purpose, since they increase the irregularity of the recurring polymer units, thereby reducing crystallinity and improving elasticity at low temperatures. Other polybasic aliphatic acids which can be used include citric acid, aconitic acid and the like.

Formation of the tertiary-amino-polyol polyesters can also be achieved by a transesterification procedure employing a lower-alkyl ester of the polycarboxylic acid, such as the methyl, ethyl, propyl, or butyl esters. Although somewhat more costly than the free acids, use of the lower-alkyl esters has the advantage of eliminating water as a by-product, the presence of which, in appreciable amounts, is undesirable during the subsequent polyisocyanate reaction.

The tertiary-amino-diol is preferably a lower-alkyl di-(lower-alkanol) amine, such as methyl, ethyl, propyl, butyl, or hexyl diethanol, dipropanol, or dibutanol amine.

The tertiary-amino-polyol containing more than 2 functional hydroxyl groups is preferably an aliphatic tertiary amine derivative containing at least 3 lower-alkanol groups attached to an amino nitrogen, such as triethanol amine, tripropanol amine, tributanol amine and N,N,N',N'-tetrakis-(2-hydroxy-propyl) ethylene diamine (Quadrol).

Substantially any reactive polyisocyanate can be employed for our purpose, including aliphatic diisocyanates, such as hexamethylene diisocyanate, and aromatic polyisocyanates, such as 2,4-tolylene diisocyanate, mixtures of 2,4- and 2,6-tolylene diisocyanate, m-phenylene diisocyanate, diphenylmethane diisocyanate, tri-(p-isocyanyl-phenyl) methane, the triisocyanate adduct formed by reaction of 1 mol of hexanetriol and 3 mols of m-tolylene diisocyanate, and the like.

The reactions which occur in the system outlined above can be generalized in the following simplified form:

Esterification of the polybasic acid or transesterification of a lower-alkyl ester of such an acid with the lower-alkyl di-(lower-alkanol) amine produces an essentially linear polymer, which can be characterized as follows:

(I)
$$AOOC-R-\underset{O}{\overset{\|}{C}}-O-\left[R'-\underset{R''}{N}-R'-O-\underset{O}{\overset{\|}{C}}-R-\underset{O}{\overset{\|}{C}}-O\right]_n-A$$

where R is an alkylene group, R' is a lower-alkylene group, R'' is a lower-alkyl group, and A is hydrogen or a lower-alkyl group. To obtain the terminal COOA groupings, the polybasic acid or its lower-alkyl ester is preferably employed in excess of the theoretical equivalent weight required for reaction with the tertiary-amino-diol, although stoichiometric quantities can also be employed, since the equilibrium mechanism of the esterification reaction is such that with stoichiometric equivalents, the reaction rarely goes to completion.

Polyester product I is reacted with a tertiary-amino-polyol containing more than 2 hydroxyl groups, which provides hydroxyl cross-linking sites for reaction with the polyisocyanate as follows:

(II)
$$\left[-O-\overset{O}{\overset{\|}{C}}-R-\overset{O}{\overset{\|}{C}}-O-\left(R'-\underset{R''}{N}-R'-O-\overset{O}{\overset{\|}{C}}-R-\overset{O}{\overset{\|}{C}}-O\right)_n-R'''-\underset{\underset{OH}{R}}{N}-R'''-\right]_x$$

where R''' is lower-alkylene. Cross-linking minimizes crystallinity and improves the strength of the polymer. Excessive cross-linking, however, should be avoided since this would tend to embrittle the product. For this reason we prefer to employ the amino-polyol containing more than 2 hydroxyl groups in a maximum of about 25% by weight of the amino-diol polyester prepolymer. Generally at least 2% is required for adequate cross-linking.

The polyisocyanate reacts with the free hydroxyl groups to form a cross-linked polyurethane as follows:

(III)
$$\left[-O-\overset{O}{\overset{\|}{C}}-R-\overset{O}{\overset{\|}{C}}-O-\left(R'-\underset{R''}{N}-R'-O-\overset{O}{\overset{\|}{C}}-R-\overset{O}{\overset{\|}{C}}-O\right)_n-R'''-\underset{R'''}{N}-R'''-\right]_x$$
$$\begin{array}{c}|\\O\\|\\C=O\\|\\N-H\\|\\R''''\\|\\N-H\\|\\C=O\\|\\O\\|\\R'''\end{array}$$
$$\left[-O-\overset{O}{\overset{\|}{C}}-R-\overset{O}{\overset{\|}{C}}-O-\left(R'-\underset{R''}{N}-R'-O-\overset{O}{\overset{\|}{C}}-R-\overset{O}{\overset{\|}{C}}-O\right)_n-R'''-\underset{}{N}-R'''-\right]_x$$

where R'''' is an aliphatic or an aromatic radical. The amount of polyisocyanate is largely determined by the number of functional hydroxyl groups available for reaction and the properties desired in the final product, and can vary within the range of about 2 to 30% by weight of the polyester prepolymer.

It should be noted that where an aliphatic polycarboxylic acid having C-linked lower-alkyl substituents, such as 2-ethyl suberic acid or 2,5-diethyl adipic acid, is employed, additional short side chains are introduced into the polymer chain.

Although we do not wish to be bound by any theory, it is our opinion that the tertiary-amino-diol used for linear chain formation, and the tertiary - amino - polyol containing more than 2 hydroxyl groups used to provide cross-linking sites at suitable intervals along the chains, impart the desired flexibility at low temperatures for the following reasons. They introduce substituent side groups which are irregularly positioned along the main chain and interrupt the geometrical regularity of the structure. This makes the chain elastomeric since it cannot pack together in the orderly array necessary for crystallinity. Long side groups on the chains are to be avoided since they tend to reduce resistance to solvation by organic solvents such as hydrocarbon fuels. The amino chain extension agents are also free from groups which produce rigidifying interchain bonding forces, such as hydrogen bonding. The tertiary-amino derivatives have the further advantage of permitting the introduction of a wide variety of substituent groups of different chain lengths and, thereby, of varying the characteristics of the polymer product. The tertiary-amino group also appears favorably to influence the low-temperature properties of the elastomer.

As aforementioned, we have obtained particularly good results with a dibasic aliphatic acid having lower-alkyl side groups attached to the carbon chain. This, we believe, may be due to the increased molecular irregularity introduced by such groups.

The tertiary-amino polyols, as aforedescribed, are essential to our process, and do not require supplementation with other polyols. However, other polyols can be employed with the amino derivatives. Diols, such as 2,2,3,3,4,4-hexafluoropentanediol, 2-methyl-2,4-hydroxypentanediol, ethylene glycol, diethylene glycol, propylene glycol, and the like, can be substituted for a portion of the lower-alkyl di-(lower-alkanol)-amine.

In practicing the process, the diol prepolymer polyester is preferably made, at least to a substantial extent, before addition of the polyol containing more than 2 hydroxyl groups. The esterification of the liquid monomers can be carried out with or without the addition of such volatile organic solvents as benzene, xylene, and toluene. The addition of a solvent, in some cases, has the advantage of reducing viscosity of the reacting mixtures and, thereby, facilitating agitation and the introduction of the polyisocyanate. The esterifying mixture, as is conventional, is heated. We have found that the improved results are obtained at relatively high reaction temperatures, e.g., about 150° to 250° C. since this produces higher molecular weight polyesters.

The presence of appreciable amounts of water in the polyester polyol prepolymer should be avoided since the water reacts with the polyisocyanate to produce $CO_2$ and urea linkages, substantial quantities of which may result in excessive porosity of the polyurethane product and excessive cross-linking. The water can be eliminated by a variety of expedients, as, for example, by use of a lower-alkyl ester instead of the free acid; bubbling a dry, inert gas, such as $N_2$, through the esterifying mixture; esterifying under vacuum; addition of a dehydrating agent, such as silica gel, anhydrous $Na_2SO_4$ or anhydrous $CaSO_4$, to the esterifying mixture.

Reaction of the polyisocyanate can be carried out at room temperature or accelerated by heating, for example, up to about 250° C.

The resulting products are solid elastomers which retain flexibility and good tensile strength at temperatures as low as —75° C. and lower. They can be compounded with fillers, such as carbon black, to improve their tensile strength. They are also resistant to liquid fuels, such as gasoline and JP-4 fuel, a high-boiling kerosene cut containing up to 30% aromatics.

*Example 1*

12.89 gms. of adipic acid and 9.17 gms. of methyl diethanol amine (mole ratio 3.5:2.5) were mixed in a vessel fitted with a loose cover to permit escape of water vapor and maintained, with agitation at 160° C. for 8 hours. 3.74 gms. of triethanol amine were then added and the mixture heated for 4 more hours. The polyester polyol reaction product was dark brown. 0.26 gm. of hexamethylene diisocyanate was admixed with the polyester product and the mixture allowed to cure at 160° C.

Observations at 15 minute intervals showed the attainment of the rubber state in 90 minutes. The rubber sample was cooled to —68° C. and retained flexibility. After several days at room temperature, a repeat determination showed flexibility at —50° C. but embrittlement at —68° C. Flex properties then continued constant.

*Example 2*

17.8 gms. of isosebacic acid (a mixture consisting of 72–80% 2-ethyl suberic acid, 12–18% 2,5-diethyl adipic acid, and 6–10% sebacic acid) were mixed with 9.09 gms. of methyl diethanol amine (mole ratio 3.5:2.5), and the mixture heated, with removal of the water vapor, at 160° C. for 8 hours. 3.74 gms. of triethanol amine were then added, and heating was continued at 160° C. for 4 hours. The product was brown. 0.283 gm. of hexamethylene diisocyanate was mixed with the polyester polyol product, and the mixture allowed to cure at 160° C.

Observations at 15 minutes intervals showed attainment of the rubber state in 1¾ hours. The rubber sample was flexible at —50° C.

*Example 3*

Polyurethane rubber was prepared according to the procedure of Example 1, employing the following reactants:

| | Gms. |
|---|---|
| Adipic acid | 15.1 |
| Butyl diethanol amine (mole ration 4.1:3.1) | 12.7 |
| Triethanol amine | 1.80 |
| Hexamethylene diisocyanate | 0.0137 |

The polyurethane rubber produced was flexible at —50° C.

*Example 4*

40.4 gms. of isosebacic acid and 23.9 gms. of methyl diethanol amine were weighed into a round-bottomed flask. A magnetic stirrer bar was inserted into the flask, and the system was connected through a condenser and a Dry Ice-acetone trap to an aspirator. Heat was applied rapidly until refluxing began in the condenser. Heating was continued for 3 hours. The temperature in the reactor was 230° C. at a vacuum of 29 mm. Hg. 2.0 gms. of triethanol amine were stirred in the reaction mixture. Heating at 230° C. and agitation were continued for 80 minutes.

50 parts of carbon black per 100 parts of the fluid polyester polyol product were stirred into the polyester at 100° C. 8 phr. of hexamethylene diisocyanate were then introduced. After 15 minutes, the mixture was transferred to a mold and cured at 100° C. for 1 hour.

The cured rubber, which has good elasticity and tensile strength, was cooled by means of a Dry Ice-acetone mixture. It was still strong, tough and flexible at —75° C., the limiting temperature of the bath. Samples of the rubber were immersed respectively in hexane and JP-4 fuel for 24 hours at 25° C. No swelling or impairment of flexibility occured.

Although this invention has been described with reference to illustrative embodiments thereof, it will be apparent to those skilled in the art that the principles of this invention can be embodied in other forms but within the scope of the claims.

We claim:

1. An elastomeric polyurethane consisting essentially of the condensation product of organic polyisocyanate and polyester polyol, said polyester polyol consisting essentially of acyl portions and alcoholic portions chemically bound through the

linkage; substantially all of the hydroxy groups of said polyester polyol which are available for the condensation reaction with said polyisocyanate being unreacted hydroxy groups on said alcoholic portions of the polyester polyol wherein:

(a) said acyl portions correspond to the residue of aliphatic polycarboxylic acids free from the —OH group at the carboxyl functions of said acid, (b) a part of said alcoholic portions correspond to the residue of lower-alkyl di-(lower-alkanol)-amine free from the hydrogen at the two —OH functions of said lower alkyl di-(lower-alkanol)-amine, each of said two —OH functions being combined with a different one of said carboxyl functions of the acyl portions to form a

linkage, and (c) the remaining part of said alcoholic portions correspond to the residue of aliphatic tertiary-aminopolyols having at least three lower-alkanol groups attached to amino nitrogen in which at least one of the —OH groups in said lower-alkanol groups is free from the hydrogen, said —OH groups free from hydrogen being combined with the remaining carboxyl functions of said acyl portions to form

linkages, said hydroxy groups available in said polyester polyol for reaction with said polyisocyanate being hydroxy groups of said aliphatic tertiary-amino-polyol.

2. The polyurethane according to claim 1 wherein said polycarboxylic acid in an aliphatic dicarboxylic acid.

3. The polyurethane according to claim 2 wherein said organic polyisocyanate is an organic diisocyanate.

4. The polyurethane according to claim 3 wherein said tertiary-amino-polyol is a tri-(lower-alkanol)-amine.

5. The polyurethane according to claim 4 wherein said organic diisocyanate is an aliphatic diisocyanate.

6. The polyurethane according to claim 5 wherein said dicarboxylic acid is one in which the two carboxyl functions are connected by a carbon chain having C-linked, lower-alkyl, side chains.

7. The polyurethane according to claim 6 wherein said organic diisocyanate is hexamethylene diisocyanate and said dicarboxylic acid is isosebacic acid.

8. The polyurethane according to claim 1 wherein said polyisocyanate is hexamethylene diisocyanate, said dicarboxylic acid isosebacic acid, said lower-alkyl di-(lower-alkanol)-amine is methyl diethanol amine, and said tertiary-amino-polyol is triethanol amine.

9. A process for making elastomeric polyurethane polymers by reacting organic polyisocyanate with polyester polyol under substantially anhydrous conditions, said polyester polyol having been prepared by reacting an organic aliphatic acyl compound having at least two —COOA groups wherein A is selected from the group consisting of H and lower alkyl, with a lower-alkyl di-(lower-alkanol)-amine, said lower-alkyl di-(lower-alkanol)-amine being employed in an amount less than that required to react with all said —COOA groups and thereafter adding an aliphatic tertiary-amino-polyol containing at least three lower alkanol groups attached to amino nitrogen, said tertiary-amino-polyol being added in an amount at least sufficient to react with the remaining —COOA groups and to provide hydroxy groups for reacting with said polyisocyanate.

10. The process of claim 9 in which the polyisocyanate is a diisocyanate and the acyl compound is dibasic.

11. The process of claim 10 in which the tertiary-amino-polyol is added in an amount up to about 25% by weight of the product of the acyl compound and the lower-alkyl di-(lower-alkanol)-amine.

12. The process of claim 11 in which the tertiary-amino-polyol is a tri-(lower-alkanol)-amine.

13. The process of claim 12 in which the diisocyanate is an aliphatic diisocyanate.

14. The process of claim 13 in which the lower alkyl di-(lower-alkanol)-amine is methyl diethanol amine, the tri-(lower-alkanol)-amine is triethanol amine, and the diisocyanate is hexamethylene diisocyanate.

15. The process of claim 10 in which the dibasic acyl compound is one in which the two —COOA groups are connected by a carbon chain having C-linked, lower-alkyl, side groups.

16. The process of claim 11 in which the dibasic acyl compound is one in which the two —COOA groups are connected by a carbon chain having C-linked, lower-alkyl, side groups.

17. The process of claim 12 in which the dibasic acyl compound is one in which the two —COOA groups are connected by a carbon chain having C-linked, lower-alkyl, side groups.

18. The process of claim 13 in which the dibasic acyl compound is one in which the two —COOA groups are connected by a carbon chain having C-linked, lower-alkyl, side groups.

19. The process of claim 14 in which the dibasic acyl compound is isosebacic acid.

References Cited by the Examiner

UNITED STATES PATENTS

| | | | |
|---|---|---|---|
| 2,676,164 | 4/54 | Charlton et al. | 260—75 |
| 2,788,332 | 4/57 | Muller et al. | 260—75 |
| 2,938,005 | 5/60 | Bick et al. | 260—75 |
| 2,966,472 | 12/60 | Fiel | 260—75 |
| 2,981,700 | 4/61 | Parker et al. | 260—75 |
| 3,003,977 | 10/61 | Hurwitz et al. | 260—75 |

LEON J. BERCOVITZ, *Primary Examiner.*

MILTON STERMAN, H. N. BURSTEIN, *Examiners.*

UNITED STATES PATENT OFFICE
CERTIFICATE OF CORRECTION

Patent No. 3,154,521            October 27, 1964

Joseph A. Terek et al.

It is hereby certified that error appears in the above numbered patent requiring correction and that the said Letters Patent should read as corrected below.

Column 2, lines 28 to 34, diagram II should appear as shown below instead of as in the patent:

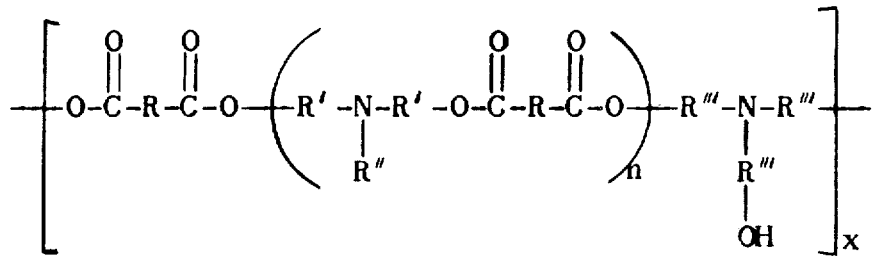

column 3, line 37, after "glycol" insert -- , dipropylene glycol, --; column 4, line 39, for "mole ration" read -- mole ratio --; column 5, line 59, after "acid", first occurrence, insert -- is --.

Signed and sealed this 23rd day of March 1965.

(SEAL)
Attest:

ERNEST W. SWIDER            EDWARD J. BRENNER
Attesting Officer            Commissioner of Patents